(12) United States Patent
Singh et al.

(10) Patent No.: US 11,062,237 B2
(45) Date of Patent: Jul. 13, 2021

(54) METHOD AND SYSTEM FOR MAXIMIZING SHARE-RIDE BOOKINGS

(71) Applicant: ANI TECHNOLOGIES PRIVATE LIMITED, Karnataka (IN)

(72) Inventors: Rajesh Kumar Singh, Bokaro Steel (IN); Shailesh Kumar, Telangana (IN); Kunal Sachdeva, New Delhi (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 374 days.

(21) Appl. No.: 16/000,574

(22) Filed: Jun. 5, 2018

(65) Prior Publication Data
US 2019/0244142 A1    Aug. 8, 2019

(30) Foreign Application Priority Data
Feb. 6, 2018    (IN) .............................. 201841004384

(51) Int. Cl.
*G06Q 10/02* (2012.01)
*G06Q 10/04* (2012.01)
(Continued)

(52) U.S. Cl.
CPC ......... *G06Q 10/02* (2013.01); *G01C 21/3438* (2013.01); *G06Q 10/04* (2013.01);
(Continued)

(58) Field of Classification Search
CPC .... G06Q 10/02; G06Q 10/04; G06Q 30/0206; G06Q 30/0284; G07B 15/02; H04W 4/40; H04W 4/021; G01C 21/3438
See application file for complete search history.

(56) References Cited

U.S. PATENT DOCUMENTS

| | | | |
|---|---|---|---|
| 2013/0226668 A1* | 8/2013 | Zou | G06Q 10/04 |
| | | | 705/7.35 |
| 2013/0246207 A1* | 9/2013 | Novak | G06Q 30/0641 |
| | | | 705/26.2 |

(Continued)

FOREIGN PATENT DOCUMENTS

WO    2013072729 A1    5/2013

OTHER PUBLICATIONS

Tachet, R., Sagarra, O., Santi, P. et al., "Scaling Law of Urban Ride Sharing", 2017, Sci Rep 7, 42868. (Year: 2017).*

(Continued)

*Primary Examiner* — George Chen
*Assistant Examiner* — Wayne S. Murray
(74) *Attorney, Agent, or Firm* — Chip Law Group

(57) ABSTRACT

A method and a system for maximizing share-ride bookings in a geographical area in a ride-sharing system are provided. Historical share-ride demands for the geographical area are estimated. A time period is segmented into time intervals such that each time interval has an equal count of the estimated historical share-ride demands. A conversion rate and a gross merchandise value (GMV) per unit of distance are determined for a first time interval at a check point of a second time interval. Error signals are generated at the check point based on deviations in the conversion rate and the GMV per unit of distance with respect to a defined conversion rate and a defined GMV per unit of distance, respectively. A share-ride fare in the second time interval is controlled based on the error signals to maximize the share-ride bookings during the second time interval.

17 Claims, 5 Drawing Sheets

(51) Int. Cl.
  *G01C 21/34* (2006.01)
  *H04W 4/021* (2018.01)
  *G06Q 30/02* (2012.01)
  *H04W 4/40* (2018.01)

(52) U.S. Cl.
  CPC ..... *G06Q 30/0206* (2013.01); *G06Q 30/0284* (2013.01); *H04W 4/021* (2013.01); *H04W 4/40* (2018.02)

(56) References Cited

U.S. PATENT DOCUMENTS

| | | | |
|---|---|---|---|
| 2015/0371452 A1* | 12/2015 | Lin | G06Q 50/30 |
| | | | 705/13 |
| 2018/0075566 A1* | 3/2018 | Lacey | G06Q 50/30 |
| 2018/0322420 A1* | 11/2018 | Marco | G06Q 50/30 |
| 2020/0133951 A1* | 4/2020 | Wang | G06F 16/2282 |

OTHER PUBLICATIONS

R. Tachet et al., "Scaling Law of Urban Ride Sharing", ResearchGate, pp. 1-42.

\* cited by examiner

METHOD AND SYSTEM FOR MAXIMIZING SHARE-RIDE BOOKINGS

CROSS-RELATED APPLICATIONS

This application claims priority of Indian Application Serial No. 201841004384, filed Feb. 6, 2018, the contents of which are incorporated herein by reference.

FIELD OF THE INVENTION

The present invention relates generally to ride-sharing systems, and more particularly, to a method and a system for maximizing share-ride bookings in a geographical area in ride-sharing systems.

BACKGROUND

With the improvement in lifestyles of individuals and limited alternatives of public or private transportations, popularity of cab services is continuously increasing for travel between source and destination locations. Generally, a cab service provider is engaged in providing the cab services to the individuals. The cab service provider deploys a set of cabs (e.g., cars) in a geographical area to supply to the demands from the individuals. In exchange for supplying to the demands from the individuals, the cab service provider charges the individuals with a certain type of compensations, for example, a monetary compensation that is usually referred to as a fare for a trip. During the operation of such cab services, the individuals may end up paying more, which results in dissatisfaction of the individuals towards the cab service provider.

Further, due to the increased demands for the cab services, the number of cabs operating in a particular geographical area is also continuously increasing. This has led to high traffic congestions along various roads of the geographical area. Moreover, due to the increased number of cabs, various environmental problems, such as air pollution or global warming, have severely increased that are affecting the environment and daily lives of the individuals. To encounter such problems, various cab service providers are following a ride-sharing approach where the individuals can share the ride with other individuals. Such ride-sharing approach may help in reducing the number of cabs that can operate in the geographical area, thereby, minimizing the various environmental problems.

In a ride-sharing system, a share-ride fare for a share-ride is based on fixed or dynamic pricing models. In the fixed pricing model, the share-ride fare for the share-ride cab services is fixed for each individual. In the dynamic pricing model, the share-ride fare for the share-ride cab services changes based on real-time operating conditions. Due to such pricing models, the individuals may end up paying more to the cab service provider, thereby, resulting in the dissatisfaction of the individuals towards the cab service provider. As a result, the cab service provider may encounter disengagement of the individuals (i.e., reduced share-ride bookings), which is least desired by the cab service provider. To increase the share-ride bookings, the cab service provider provides offers, such as monetary discounts on the share-ride fares to the individuals for their share-rides. Such discounts may help in increasing the share-ride bookings for the share-rides, but can also degrade a gross merchandise value (GMV) per unit of distance for the cab service provider, which may not be desirable from the perspective of the cab service provider.

In light of the foregoing, there exists a need for a technical and more reliable solution that solves the above-mentioned problems and manages the share-ride fares in the ride-sharing system. Further, the solution should maximize the share-ride bookings in the geographical area and ensure that the GMV per unit of distance for the cab service provider is above a defined threshold value.

SUMMARY

Various embodiments of the present invention provide a method and a system for maximizing share-ride bookings in a geographical area in a ride-sharing system. The method includes one or more operations that are executed by circuitry of the system to maximize the share-ride bookings. The circuitry extracts historical share-ride booking and demand data for the geographical area from a database server. Further, the circuitry determines a set of source-destination clusters for the geographical area based on pick-up and drop-off latitude and longitude information associated with the extracted historical share-ride booking data. The circuitry further estimates historical share-ride demands for the geographical area based on the extracted historical share-ride demand data. A time period is segmented into a plurality of time intervals such that each time interval has an equal count of the estimated historical share-ride demands. A start time of each time interval is a check point of each time interval. Each time interval is associated with an end time. The end time of a first time interval of the plurality of time intervals is the start time of a second time interval of the plurality of time intervals, and so on.

Further, at the check point of the second time interval, the circuitry determines a conversion rate and a gross merchandise value (GMV) per unit of distance for the first time interval. The conversion rate and the GMV per unit of distance for the first time interval are determined based on first share-ride bookings associated with the first time interval. For example, the conversion rate for the first time interval is determined based on a ratio of a first count of the first share-ride bookings associated with the first time interval and a second count of the estimated historical share-ride demands associated with the first time interval. The GMV per unit of distance for the first time interval is determined based a ratio of a total share-ride fare and a total share-ride distance associated with the first time interval. The total share-ride fare associated with the first time interval is determined based on a first sum of share-ride fares of the first share-ride bookings associated with the first time interval. The total share-ride distance associated with the first time interval is determined based on a second sum of share-ride distances of the first share-ride bookings associated with the first time interval.

The circuitry generates first and second error signals at the check point of the second time interval. The first and second error signals are generated based on deviations in the determined conversion rate and the determined GMV per unit of distance of the first time interval with respect to a defined conversion rate and a defined GMV per unit of distance, respectively. The defined conversion rate and the defined GMV per unit of distance are provided by an administrator of a cab service provider as per business requirement. The circuitry further generates first and second control signals based on the generated first and second error signals, respectively, to control a share-ride fare of each of second share-ride bookings in the second time interval. Based on the generated first and second control signals, the share-ride fare of each of the second share-ride bookings associated with a subset of source-destination clusters is either increased or decreased. The subset of source-destination clusters is selected from the set of source-destination clusters based on the estimated historical share-ride demands of each of the set of source-destination clusters in the second time interval, the conversion rate of each of the set of source-destination clusters in the first time interval, or any combination thereof.

Thus, the method and the system of the present invention provide a choice to the cab service provider for maximizing the share-ride bookings in the geographical area. The share-ride fares of the share-ride bookings are dynamically controlled at various check points, and thus, the fixed GMV or conversion rate requirements of the cab service provider can be attained irrespective of variations in real-time share-ride bookings. Further, when the GMV of the cab service provider is more than the defined GMV, the share-ride fares for the share-ride bookings are automatically reduced from previous share-ride fares, and thus, passengers requesting the share-rides in real-time may have to spend less on the share-ride fares for their requested share-rides, which maximizes the share-ride bookings and occupancies of vehicles in the ride-sharing system.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
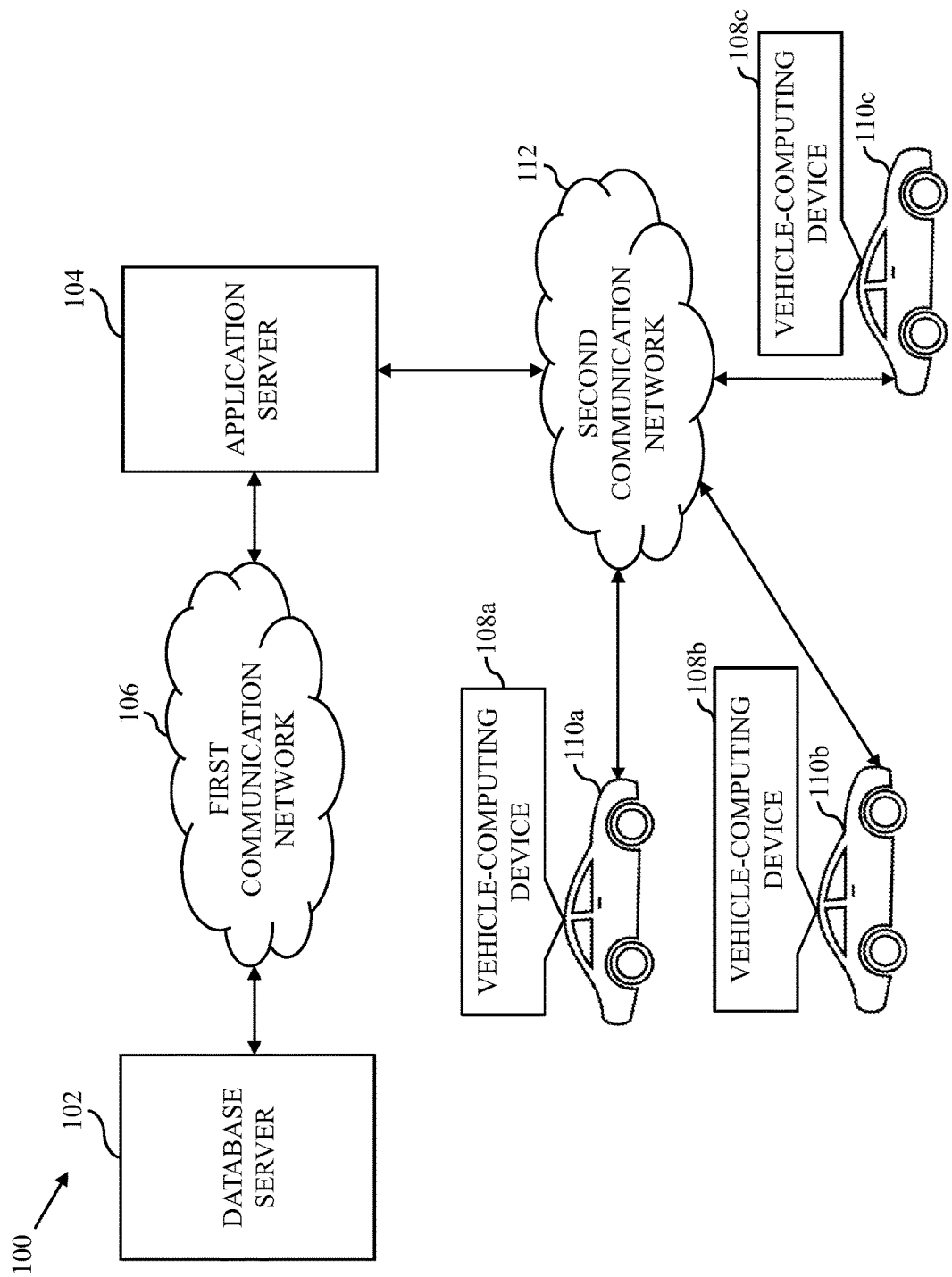
FIG. 1 is a block diagram that illustrates an environment in which various embodiments of the present invention are practiced.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for maximizing share-ride bookings in a geographical area in a ride-sharing system that improves a conversion rate or a GMV per unit of distance for the geographical area by maintaining the conversion rate or the GMV per unit of distance greater than a defined conversion rate or a defined GMV per unit of distance, respectively. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A transportation service is a service in which a vehicle is provided to passengers to transit between source and destination locations specified by the passengers. The vehicle is a means of transport that is deployed by a transport provider to provide the transportation service, such as an on-demand cab service, to the passengers. For example, the vehicle may be an automobile, a bus, a car, a bike, or the like. The transportation service may be a share-ride service or a non-share ride service, i.e., a dedicated ride service. In the share-ride service, the transport provider allows a passenger to book the vehicle for a ride that may be shared by other passengers. In the non-share ride or the dedicated service, the transport provider does not allocate the vehicle to the other passengers, when the vehicle has already been allocated to the passenger for the ride. Hereinafter, various methods and systems for maximizing the share-ride bookings in the geographical area in the ride-sharing system have been described that will become apparent to a person having ordinary skill in the relevant art.

Referring now to FIG. 1, a block diagram that illustrates an environment 100 in which various embodiments of the present invention are practiced, is shown. The environment 100 includes a database server 102 and an application server 104 that are connected to each other by way of a first communication network 106. Examples of the first communication network 106 include, but are not limited to, a wireless fidelity (Wi-Fi) network, a light fidelity (Li-Fi) network, a satellite network, the Internet, a mobile network such as a cellular data network, a high speed packet access (HSPA) network, or any combination thereof. The environment 100 further includes one or more vehicle-computing devices, such as vehicle-computing devices 108a-108c that are associated with vehicles 110a-110c, respectively. The vehicle-computing devices 108a-108c are connected to the application server 104 by way of a second communication network 112. Examples of the second communication network 112 include, but are not limited to, a Wi-Fi network, a Li-Fi network, a satellite network, the Internet, a mobile network such as a cellular data network, a HSPA network, or any combination thereof. In an exemplary embodiment, the environment 100 may include a single communication network, such as the first or second communication network 106 or 112. In such a scenario, the database server 102, the application server 104, and the vehicle-computing devices 108a-108c may communicate with each other by way of the first or second communication network 106 or 112.

The database server 102 is a data management and storage server that includes a processor (not shown) and a memory (not shown) for managing and storing historical share-ride booking data. The historical share-ride data may be divided by geographical areas and includes travel data of share-rides taken by passengers in the past using various vehicles, such as the vehicles 110a-110c, provided by a cab service provider. In an exemplary embodiment, the historical share-ride booking data of a passenger may include a pick-up location, a drop-off location, a pick-up time, a drop-off time, a ride fare, or a travel distance of the share-rides that had been taken by the passenger in the past. The processor of the database server 102 receives the historical share-ride booking data from devices (associated with the passengers or drivers of the vehicles 110a-110c), and stores the historical share-ride booking data in the memory of the database server 102. In a specific embodiment of the present invention, the historical share-ride booking data may include latitude and longitude information of the pick-up and drop-off locations of the share-rides.

Further, the database server 102 manages and stores historical share-ride demand data. The historical share-ride demand data may be divided by geographical areas and includes booking data and non-booking data of the passengers. In an embodiment, the booking data is the historical share-ride booking data of the passengers for which the cab service provider had provided vehicle services to the passengers. Further, the non-booking data includes demands initiated by the passengers that were not provided by the cab service provider due to cancellations of the initiated demands by the passengers or the drivers. The non-booking data may further include demands that were not initiated by the passengers, however, the passengers may have shown intent to initiate the demands. The intent of the passengers may be detected based on a frequency of usage of a service application installed on passenger devices (not shown) of the passengers. The service application may be a software application that can be installed on the passenger devices by the passengers, and thereafter, may be utilized to initiate the booking requests for the share-rides.

Further, the database server 102 manages and stores passenger information of the passengers and driver information of the drivers. In an exemplary embodiment, the passenger information of the passenger may include at least a passenger name, a passenger contact number, or a passenger account of the passenger registered with the transport service provider. Similarly, the driver information of a driver may include at least a driver name, a registered vehicle, or a driver account of the driver registered with the transport service provider. In an embodiment, the database server 102 may receive a query from the application server 104 over the first communication network 106 to extract data stored in the memory of the database server 102. In response to the received query, the database server 102 retrieves and provides the requested data to the application server 104 over the first communication network 106. Examples of the database server 102 include, but are not limited to, a personal computer, a laptop, or a network of computer systems.

The application server 104 is a computing device, a software framework, or a combination thereof, that may provide a generalized approach to create the application server implementation. In an embodiment, the operation of the application server 104 may be dedicated to execution of procedures, such as, but not limited to, programs, routines, or scripts stored in one or more memories for supporting its applied applications. In an embodiment, the application server 104 processes the historical share-ride booking data, including that of the geographical area, and determines a set of source-destination clusters for the geographical area. Further, the application server 104 estimates historical share-ride demands of the geographical area based on the historical share-ride demand data. The application server 104 segments a time period into time intervals such that each time interval has an equal count of the estimated historical share-ride demands. In one exemplary embodiment, a start time of each time interval is a check point of each time interval. The check point is a point at which the application server 104 performs one or more checks, for example, with respect to a conversion rate and a GMV per unit of distance (hereinafter, the GMV). In another exemplary embodiment, the check point is any point between the start and end times of each time interval at which the application server 104 may perform the one or more checks.

The application server 104 determines the conversion rate and the GMV for a first time interval of the time intervals at the check point of a second time interval of the time intervals. The conversion rate and the GMV are determined based on first share-ride bookings associated with the first time interval. The application server 104 further generates first and second error signals at the check point of the second time interval. The first error signal is generated based on a deviation in the determined conversion rate of the first time interval with respect to a defined conversion rate. The second error signal is generated based on a deviation in the determined GMV of the first time interval with respect to a defined GMV. Based on the generated first and second error signals, the application server 104 controls share-ride fares of second share-ride bookings associated with the second time interval that may maximize the second share-ride bookings during the second time interval. The second share-ride bookings are associated with a subset of source-destination clusters selected from the set of source-destination clusters. Various operations of the application server 104 have been described in detail in conjunction with FIGS. 2-5.

The application server 104 may be realized through various web-based technologies, such as, but not limited to, a Java web-framework, a .NET framework, a PHP framework, or any other web-application framework. Examples of the application server 104 include, but are not limited to, a personal computer, a laptop, or a network of computer systems.

The vehicle-computing devices 108a-108c are computing devices that are used by the drivers to perform one or more activities. For example, the driver of the vehicle 110a may use the vehicle-computing device 108a to view an upcoming ride request from the passenger. The driver may also use the vehicle-computing device 108a to accept or reject the upcoming ride request. The driver may further use the vehicle-computing device 108a to view a route between the pick-up and drop-off locations of the passenger provided by the application server 104. Further, each of the vehicle-computing devices 108a-108c may transmit information, such as an availability status, a current booking status, a ride completion status, a pick-up time, a drop-off time, a ride fare, or the like, to the application server 104. In an exemplary embodiment, the vehicle-computing devices 108a-108c may be vehicle head units. In another exemplary embodiment, the vehicle-computing devices 108a-108c may be external communication devices, such as smartphones, tablet computers, laptops, or any other portable communication devices, that are placed inside the vehicles 110a-110c, respectively.

Figure 2:
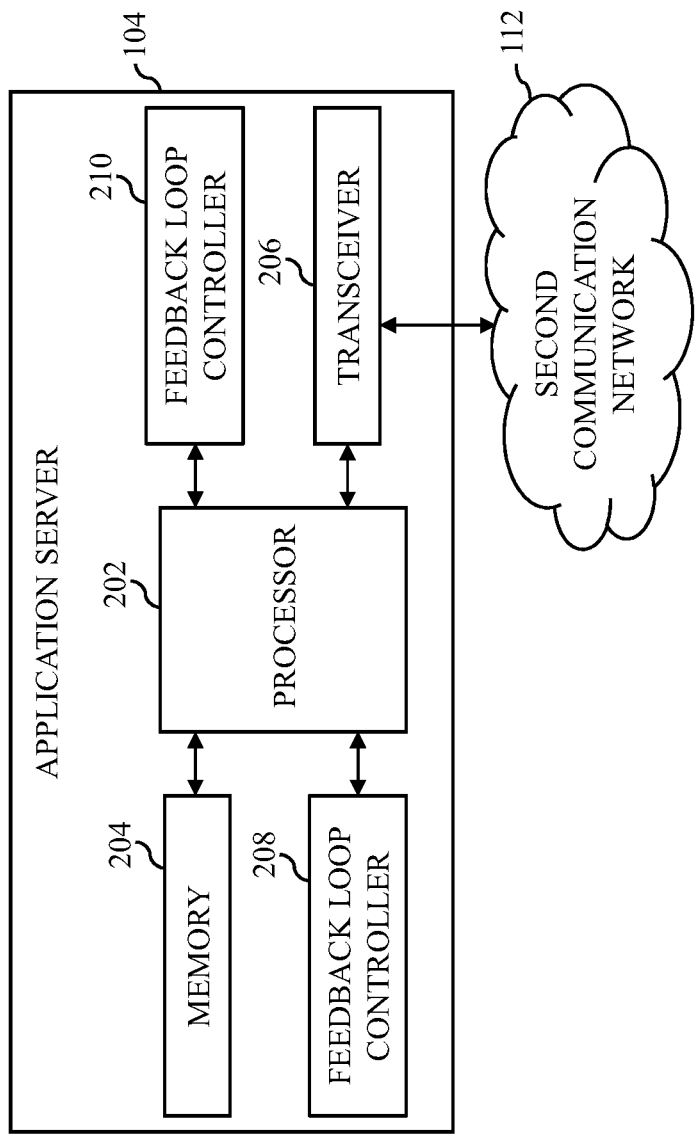
FIG. 2 is a block diagram that illustrates an application server of the environment of FIG. 1, in accordance with an embodiment of the present invention.

Referring now to FIG. 2, a block diagram that illustrates the application server 104 of the environment 100 of FIG. 1 is shown, in accordance with an embodiment of the present invention. The application server 104 includes a processor 202, a memory 204, a transceiver 206, and feedback loop controllers 208 and 210 that communicate with each other by way of a communication bus (not shown).

The processor 202 includes suitable logic, circuitry, and/or interfaces that are operable to execute one or more instructions stored in the memory 204 to perform one or more operations. For example, the processor 202 determines the set of source-destination clusters, including that of the geographical area, and stores in the memory 204. The processor 202 estimates the historical share-ride demands of the geographical area, and stores in the memory 204. Further, the processor 202 segments the time period into the time intervals such that each time interval has an equal count of the estimated historical share-ride demands. The processor 202 determines the conversion rate and the GMV of the first time interval at the check point of the second time interval, and provides the determined conversion rate and the determined GMV of the first time interval as an input to the feedback loop controllers 208 and 210, respectively, at the check point of the second time interval. Based on first and second control signals generated by the feedback loop controllers 208 and 210 at the check point of the second time interval, the processor 202 controls the share-ride fare of each of the second share-ride bookings associated with the subset of source-destination clusters in the second time interval. Examples of the processor 202 include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor 202 is compatible with multiple operating systems.

The memory 204 includes suitable logic, circuitry, and/or interfaces to store the one or more instructions that are executed by the processor 202 to perform the one or more operations. The memory 204 stores the historical share-ride booking and demand data, including that of the geographical area extracted from the database server 102 by the processor 202. The memory 204 further stores the defined conversion rate and the defined GMV provided by the transport service provider. The memory 204 further stores the share-ride fare associated with each time interval. Examples of the memory 204 include, but are not limited to, a random access memory (RAM), a read-only memory (ROM), and a programmable ROM (PROM), an erasable PROM (EPROM).

The transceiver 206 includes suitable logic, circuitry, and/or interfaces that are operable to transmit (or receive) data to (or from) various servers or devices, such as the database server 102 or the vehicle-computing devices 108a-108c over the first or second communication network 106 or 112, respectively. For example, the transceiver 206 transmits the query to the database server 102 to retrieve the historical share-ride booking and demand data. Further, in response to the transmitted query, the transceiver 206 receives the historical share-ride booking and demand data from the database server 102, and stores in the memory 204. Further, the transceiver 206 receives real-time share-ride information, such as share-ride fares and share-ride distances of share-ride bookings associated with each time interval, from the vehicle-computing devices 108a-108c or the passenger devices of the passengers, and stores in the memory 204. Examples of the transceiver 206 include, but are not limited to, an antenna, a radio frequency transceiver, a wireless transceiver, and a Bluetooth transceiver. The transceiver 206 communicates with the database server 102 and the vehicle-computing devices 108a-108c using various wired and wireless communication protocols, such as TCP/IP, UDP, $2^{nd}$ Generation (2G), $3^{rd}$ Generation (3G), $4^{th}$ Generation (4G) communication protocols, or any combination thereof.

Each of the feedback loop controllers 208 and 210 includes suitable logic, circuitry, and/or interfaces that are operable to execute one or more instructions stored in the memory 204 to perform one or more operations. For example, the feedback loop controller 208 generates the first error signal at the check point of each time interval based on the determined conversion rate of a previous time interval and the defined conversion rate. Similarly, the feedback loop controller 210 generates the second error signal at the check point of each time interval based on the determined GMV of the previous time interval and the defined GMV. The feedback loop controllers 208 and 210 further generate the first and second control signals at the check point of each time interval based on the generated first and second error signals, and provide the first and second control signals to the processor 202. Examples of the feedback loop controllers 208 and 210 include, but are not limited to, a proportional controller, a derivative controller, an integral controller, a proportional-integral (PI) controller, a proportional-derivative (PD) controller, and a proportional-integral-derivative (PID) controller. The feedback loop controllers 208 and 210 may be implemented by means of one or more processing technologies, such as, but not limited to, an ASIC processor, a RISC processor, a CISC processor, and a FPGA.

In operation, the processor 202 generates the query to extract the historical share-ride booking and demand data from the database server 102. The processor 202 transmits the generated query to the database server 102 by way of the transceiver 206 over the first communication network 106. The database server 102 receives the generated query, and processes the received query to extract the historical share-ride booking and demand data. The database server 102 transmits the extracted historical share-ride booking and demand data to the transceiver 206 over the first communication network 106. The transceiver 206 receives the extracted historical share-ride booking and demand data from the database server 102, and stores in the memory 204. The historical share-ride booking data includes the latitude and longitude information of the pick-up and drop-off locations associated with the share-rides provided by the transport service provider to the passengers in the past. The historical share-ride demand data includes a count of confirmed historical bookings and a count of cancelled historical bookings. The historical share-ride demand data further includes a count of intent-related demands that were not requested by the passengers, but the passengers may have intention to initiate the demands. Such intent-related demands may be detected based on the frequency of usage of the installed service application by the passengers on the passenger devices. For example, if the passenger opened the installed service application five times, for example, between "9.30 AM to 10.00 AM", however, had not initiated any booking request, then such intent of the passenger may be detected as an intent-related demand of the passenger.

Based on the historical share-ride booking data extracted for the geographical area, the processor 202 determines the set source-destination clusters for the geographical area. The set of source-destination clusters is determined based on the pick-up and drop-off latitude and longitude information of the share-rides associated with the extracted historical share-ride booking data. For example, the processor 202 may process the historical share-ride booking data to identify pairs of source and destination locations. Each pair includes a source location and a corresponding destination location of a share-ride associated with the extracted historical share-ride booking data. After identifying the pairs of source and destination locations, the processor 202 processes the pick-up and drop-off latitude and longitude information of the source and destination locations of each pair, and identifies the set of source-destination clusters such that each source-destination cluster includes one or more pairs of source and destination locations that are along one route of the geographical area. In another embodiment, the processor 202 identifies the set of source-destination clusters such that each source-destination cluster includes one or more pairs of source and destination locations that are along routes of the geographical area such that the routes are in a vicinity (i.e., within a defined distance threshold) of each other. The defined distance threshold is utilized for shared distances associated with the routes. In an exemplary embodiment, the processor 202 identifies three pairs of source and destination locations. The first pair is associated with a first source location (S1) and a first destination location (D1). The second pair is associated with a second source location (S2) and a second destination location (D2). The third pair is associated with a third source location (S3) and a third destination location (D3). For the first source location (S1) in the first pair, the processor 202 identifies that the second and third source locations (S2 and S3) are in the vicinity of the first source location (S1). Similarly, for the first destination location (D1) in the first pair, the processor 202 identifies that the second destination location (D2) is in the vicinity of the first destination location (D1). In such a scenario, the processor 202 identifies the first and second pairs as a first source-destination cluster and the third combination as a second source-destination cluster.

Further, in an embodiment, the processor 202 estimates the historical share-ride demands for the geographical area based on the historical share-ride demand data. The historical share-ride demands are estimated based on the count of confirmed historical bookings, the count of cancelled historical bookings, or the count of intent-related demands of the passengers. Further, in an embodiment, the processor 202 segments the time period into the time intervals such that each time interval has the equal count of the estimated historical share-ride demands. For example, for a "24 hours" time period, the estimated historical share-ride demands are "450". In such a scenario, the processor 202 may segment the "24 hours" time period into the time intervals, for example, first, second, and third time intervals having time stamps of "6 AM to 1 PM", "1 PM to 10 PM", and "10 PM to 6 AM", respectively, such that each of the first, second, and third time intervals has the equal count of the estimated historical share-ride demands (i.e., "150" each).

With respect to the ongoing example, the first time interval is associated with a start time "6 AM" and an end time "1 PM". Similarly, the second and third time intervals are associated with start times "1 PM" and "10 PM", and end times "10 PM" and "6 AM", respectively. The start time of each of the first, second, and third time intervals is the check point of each of the first, second, and third time intervals. For example, check points of the first, second, and third time intervals are "6 AM", "1 PM", and "10 PM", respectively.

Further, in an embodiment, the processor 202 determines the conversion rate and the GMV at the check point of each time interval. The conversion rate and the GMV of a previous time interval are determined based on previous share-ride bookings associated with the previous time interval. For example, at the check point of the second time interval, the processor 202 determines the conversion rate and the GMV for the first time interval based on the first share-ride bookings associated with the first time interval. The first share-ride bookings are confirmed bookings for which the transport service provider has provided vehicle services to the passengers during the first time interval. In an embodiment, the conversion rate for the first time interval is determined based on a ratio of a first count and a second count. The first count is a count of the first share-ride bookings in the first time interval, and the second count is a count of the estimated historical share-ride demands associated with the first time interval. For example, the processor 202 determines the first and second counts of the first time interval (e.g., "6 AM to 1 PM") as "130" and "150", respectively. Thus, at the check point (e.g., "1 PM") of the second time interval (e.g., "1 PM to 10 PM"), the processor 202 determines the conversion rate for the first time interval (e.g., "6 AM to 1 PM") as "0.866"(="130" divided by "150"), and stores in the memory 204.

Further, in an embodiment, the GMV for the first time interval is determined based on a ratio of a total share-ride fare and a total share-ride distance associated with the first time interval. The total share-ride fare associated with the first time interval is determined based on a first sum of share-ride fares of the first share-ride bookings associated with the first time interval. The total share-ride distance associated with the first time interval is determined based on a second sum of share-ride distances of the first share-ride bookings associated with the first time interval. For example, the processor 202 determines the first and second sums of the first time interval (e.g., "6 AM to 1 PM") as "$ 1000" and "400 km", respectively, for the first share-ride bookings "130". Thus, at the check point (e.g., "1 PM") of the second time interval (e.g., "1 PM to 10 PM"), the processor 202 determines the GMV for the first time interval (e.g., "6 AM to 1 PM") as "$ 2.5 per Km"(="$ 1000" divided by "400 Km"), and stores in the memory 204.

Further, in an embodiment, the feedback loop controller 208 generates the first error signal at the check point of each time interval. The first error signal is generated based on the deviation of the determined conversion rate of the previous time interval with respect to the defined conversion rate. For example, the feedback loop controller 208 generates the first error signal at the check point (e.g., "1 PM") of the second time interval (e.g., "1 PM to 10 PM") based on the deviation of the determined conversion rate (e.g., "0.866") of the first time interval (e.g., "6 AM to 1 PM") with respect to the defined conversion rate (e.g., "0.75"). The first error signal at the check point (e.g., "1 PM") of the second time interval (e.g., "1 PM to 10 PM") is generated as "0.116"(=0.866−0.75).

Further, in an embodiment, the feedback loop controller 210 generates the second error signal at the check point of each time interval. The second error signal is generated based on the deviation of the determined GMV of the previous time interval with respect to the defined GMV. For example, the feedback loop controller 210 generates the second error signal at the check point (e.g., "1 PM") of the second time interval (e.g., "1 PM to 10 PM") based on the deviation of the determined GMV (e.g., "$ 2.5 per Km") of the first time interval (e.g., "6 AM to 1 PM") with respect to the defined GMV (e.g., "$ 3 per Km"). The second error signal at the check point (e.g., "1 PM") of the second time interval (e.g., "1 PM to 10 PM") is generated as "−$ 0.5 per Km"(="$ 3 per Km−$ 3 per Km").

Further, in an embodiment, the feedback loop controllers 208 and 210 generates the first and second control signals at the check point of each time interval. The first and second control signals are generated based on the first and second error signals, respectively, at the check point of each time interval. For example, the feedback loop controller 208 generates the first control signal at the check point of the second time interval based on the first error signal. The first control signal indicates whether the first error signal is positive or negative. If the first error signal is positive, then the first control signal may indicate that the conversion rate is stable, and thus, the share-ride fare may not be changed in the second time interval. However, if the first error signal is negative, then the first control signal may indicate that the conversion rate is unstable, and thus, the share-ride fare may be changed in the second time interval to improve the conversion rate. Similarly, the feedback loop controller 210 generates the second control signal at the check point of the second time interval based on the second error signal. The second control signal indicates whether the second error signal is positive or negative. If the second error signal is positive, then the second control signal may indicate that the GMV is stable, and thus, the share-ride fare may not be changed in the second time interval. However, if the second error signal is negative, then the second control signal may indicate that the GMV is unstable, and thus, the share-ride fare may be changed in the second time interval to improve the GMV. After generating the first and second control signals, the feedback loop controllers 208 and 210 stores the first and second control signals in the memory 204.

Further, in an embodiment, the processor 202 retrieves the first and second control signals from the memory 204, and processes the first and second control signals to control the share-ride fares of the second share-ride bookings during the second time interval. The processor 202 processes the first and second control signals to either increase or decrease the share-ride fares during the second time interval, when at least one of the first and second control signals is negative.

In an exemplary embodiment, if the first and second control signals at the check point of the second time interval are positive, then the processor 202 may decrease the share-ride fare of the second share-ride bookings associated with the subset of source-destination clusters to maximize the second share-ride bookings during the second time interval. The subset of source-destination clusters may be selected from the set of source-destination clusters based on at least one of the estimated historical share-ride demands of each of the set of source-destination clusters in the second time interval or the conversion rate of each of the set of source-destination clusters associated with the first time interval. For example, the subset of source-destination clusters are clusters from the set of source-destination clusters having the estimated historical share-ride demands below a defined threshold demand. In another example, the subset of source-destination clusters are clusters from the set of source-destination clusters having the determined conversion rate in the first time interval below the defined conversion rate. Thus, the decrease in the share-ride fares for the subset of source-destination clusters in the second time interval maximizes the second share-ride bookings associated with the subset of source-destination clusters, thereby, maximizing the second share-ride bookings during the second time interval.

In another exemplary embodiment, if the first and second control signals at the check point of the second time interval are negative, then the processor 202 may decrease the share-ride fare of the second share-ride bookings associated with the subset of source-destination clusters to maximize the second share-ride bookings in the second time interval. The subset of source-destination clusters may be selected from the set of source-destination clusters based on at least one of the estimated historical share-ride demands of each of the set of source-destination clusters in the second time interval or the conversion rate of each of the set of source-destination clusters associated with the first time interval. For example, the subset of source-destination clusters are clusters from the set of source-destination clusters having the estimated historical share-ride demands above the defined threshold demand. In another example, the subset of source-destination clusters are clusters from the set of source-destination clusters having the determined conversion rate in the first time interval below the defined conversion rate. Thus, the decrease in the share-ride fare for the subset of source-destination clusters in the second time interval maximizes the second share-ride bookings associated with the subset of source-destination clusters, thereby, maximizing the second share-ride bookings during the second time interval.

In another exemplary embodiment, if the first and second control signals at the check point of the second time interval are negative and positive, respectively, then the processor 202 may decrease the share-ride fare of the second share-ride bookings associated with the subset of source-destination clusters. The subset of source-destination clusters may be selected from the set of source-destination clusters based on at least one of the estimated historical share-ride demands of each of the set of source-destination clusters in the second time interval or the conversion rate of each of the set of source-destination clusters associated with the first time interval. For example, the subset of source-destination clusters are clusters from the set of source-destination clusters having the estimated historical share-ride demands below the defined threshold demand. In another example, the subset of source-destination clusters are clusters from the set of source-destination clusters having the determined conversion rate in the first time interval below the defined conversion rate. Thus, the decrease in the share-ride fare for the subset of source-destination clusters in the second time interval maximizes the second share-ride bookings associated with the subset of source-destination clusters, thereby, maximizing the second share-ride bookings during the second time interval.

In another exemplary embodiment, if the first and second control signals at the check point of the second time interval are positive and negative, respectively, then the processor 202 may increase the share-ride fare of the second share-ride bookings associated with the subset of source-destination clusters. The subset of source-destination clusters may be selected from the set of source-destination clusters based on at least one of the estimated historical share-ride demands of each of the set of source-destination clusters in the second time interval or the conversion rate of each of the set of source-destination clusters associated with the first time interval. For example, the subset of source-destination clusters are clusters from the set of source-destination clusters having the estimated historical share-ride demands above the defined threshold demand. In another example, the subset of source-destination clusters are clusters from the set of source-destination clusters having the determined conversion rate in the first time interval above the defined conversion rate. Thus, the increase in the share-ride fare for the subset of source-destination clusters in the second time interval maximizes the GMV during the second time interval.

Figure 3:
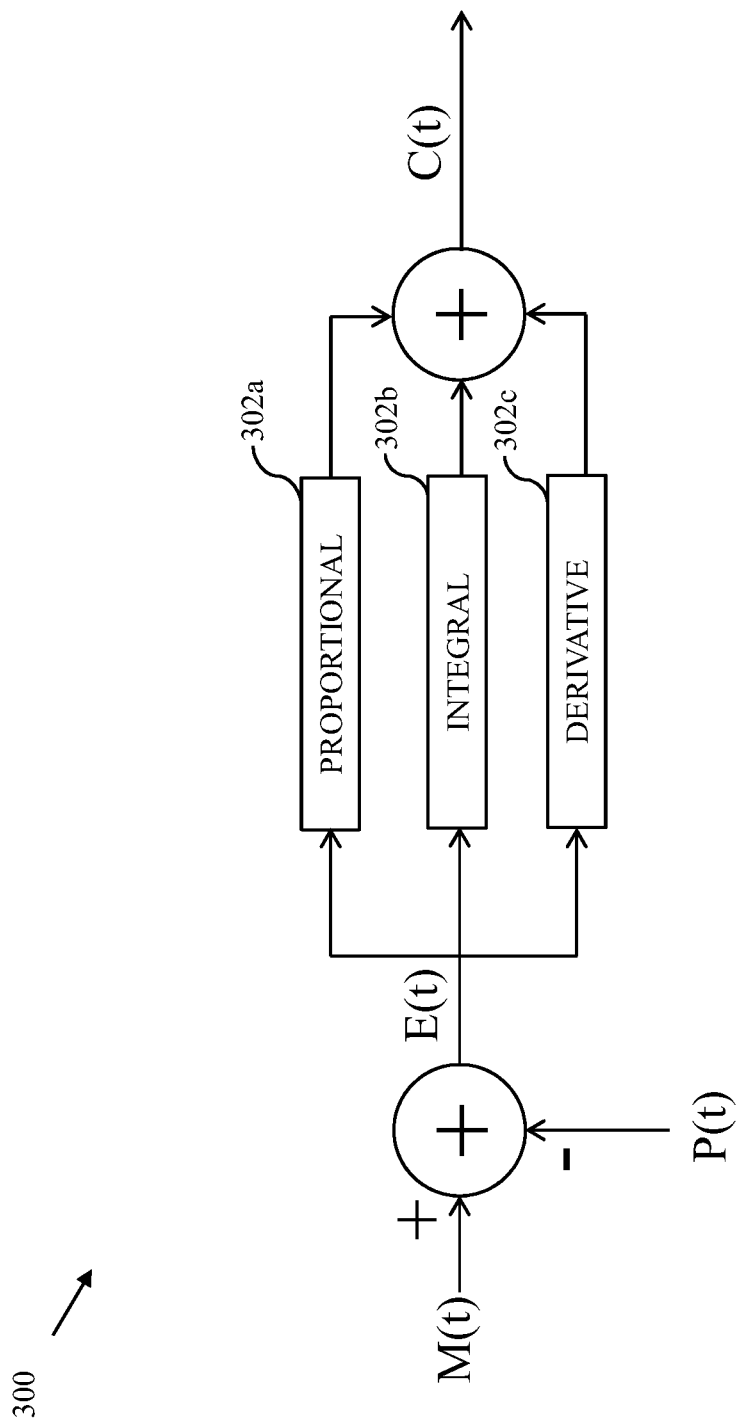
FIG. 3 is a block diagram that illustrates a feedback loop controller, in accordance with an embodiment of the present invention.

Referring now to FIG. 3, a block diagram that illustrates a feedback loop controller 300 is shown, in accordance with an embodiment of the present invention. The feedback loop controller 300 is one of the feedback loop controllers 208 and 210. In an exemplary embodiment, the feedback loop controller 208 or 210 may be implemented using a proportional-integral-derivative (PID) controller. The PID controller includes a proportional module 302a, an integral module 302b, and a derivative module 302c. In an exemplary embodiment, the PID controller generates the error signal E(t), such as the first or second error signal, at the check point of the second time interval based on a difference between a measured value M(t) associated with the first time interval and a desired value P(t). The measured value M(t) may be one of the determined conversion rate or the determined GMV of the first time interval. The desired value P(t) may be one of the defined conversion rate or the defined GMV. After generating the error signal E(t), the PID controller applies a correction based on one or more constant parameters, such as a proportional constant $K_P$, an integral constant $K_I$, and a derivative constant $K_D$ associated with the proportional module 302a, the integral module 302b, and the derivative module 302c, respectively.

Further, the PID controller generates the control signal C(t), such as the first or second control signal, based on the generated error signal E(t), such as the first or second error signal, and the proportional constant $K_P$, the integral constant $K_I$, and the derivative constant $K_D$. The generated control signal C(t) may be obtained by means of equation (1):

$$C(t) = K_p * E(t) + K_I * \int E(t) + K_D * \frac{dE(t)}{dt} \quad (1)$$

Based on the generated control signal C(t), the share-ride fare of each of the second share-ride bookings associated with the subset of source-destination clusters is controlled (i.e., either increased, decreased, or is kept unchanged) during the second time interval.

Figure 4:
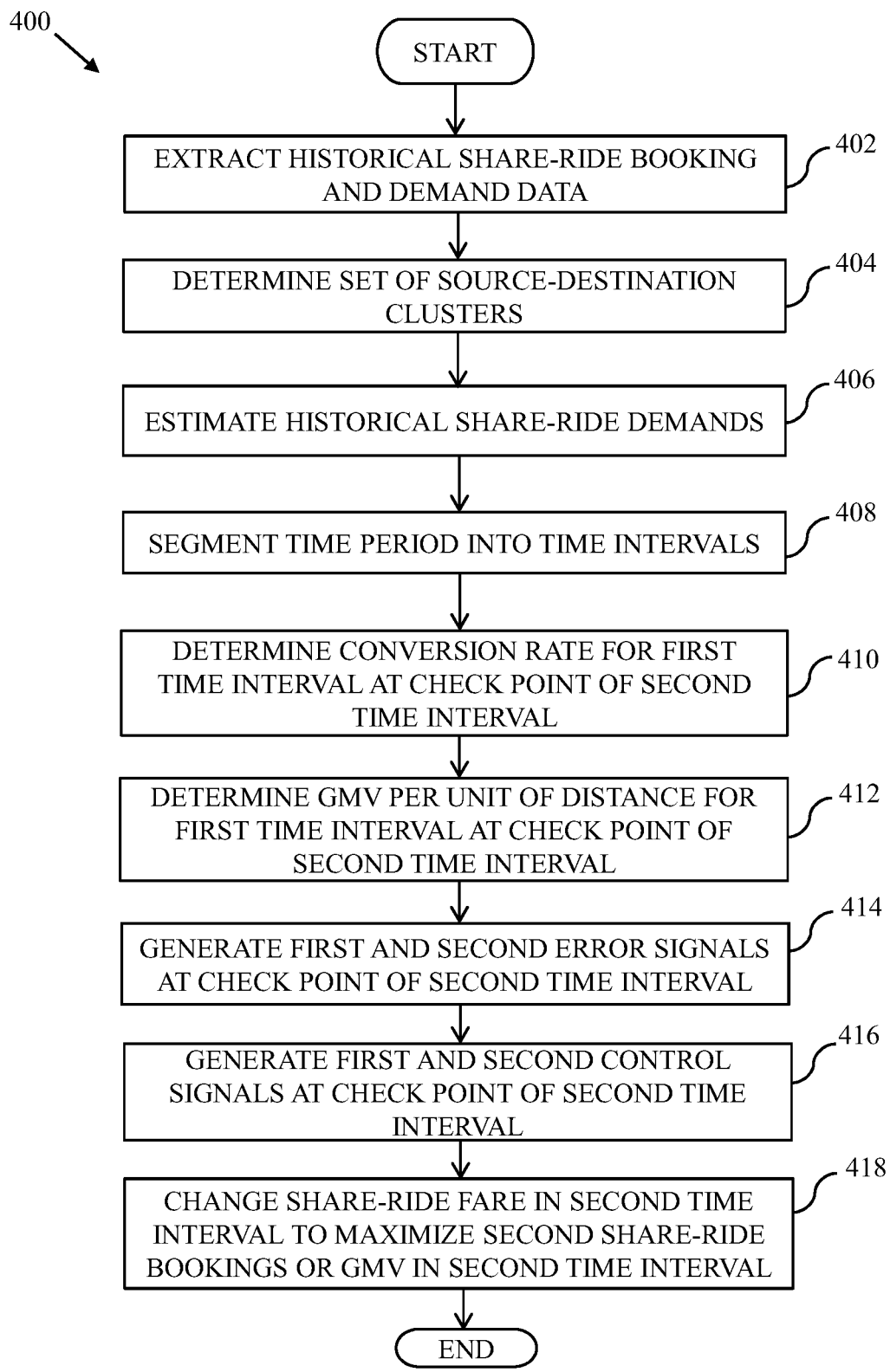
FIG. 4 is a flow chart that illustrates a method for maximizing share-ride bookings in a geographical area in a ride-sharing system, in accordance with an embodiment of the present invention.

Referring now to FIG. 4, a flow chart 400 that illustrates a method for maximizing the share-ride bookings in the geographical area in the ride-sharing system is shown, in accordance with an embodiment of the present invention.

At step 402, the historical share-ride booking and demand data are extracted. The processor 202 extracts the historical share-ride booking and demand data for the geographical area from the database server 102 over the first communication network 106.

At step 404, the set of source-destination clusters is determined for the geographical area. The processor 202 determines the set of source-destination clusters for the geographical area based on the pick-up and drop-off latitude and longitude information associated with the extracted historical share-ride booking data.

At step 406, the historical share-ride demands are estimated for the geographical area. The processor 202 estimates the historical share-ride demands based on the extracted historical share-ride demand data.

At step 408, the time period is segmented into the time intervals. The processor 202 segments the time period into the time intervals such that each time interval has the equal count of the estimated historical share-ride demands. In an embodiment, the start time of each time interval is the check point of each time interval. Further, each time interval is associated with the end time. The end time of the first time interval is the start time of the second time interval. In another embodiment, the check point is any time between the start and end times.

At step 410, the conversion rate for the first time interval is determined at the check point of the second time interval. The processor 202 determines the conversion rate for the first time interval based on the ratio of the first count of the first share-ride bookings and the second count of the estimated historical share-ride demands associated with the first time interval.

At step 412, the GMV for the first time interval is determined at the check point of the second time interval. The processor 202 determines the GMV for the first time interval based on the ratio of the total share-ride fare and the total share-ride distance associated with the first time interval. The total share-ride fare associated with the first time interval is determined based on the first sum of the share-ride fares of the first share-ride bookings. The total share-ride distance associated with the first time interval is determined based on the second sum of the share-ride distances of the first share-ride bookings.

At step 414, the first and second error signals are generated at the check point of the second time interval. The feedback loop controllers 208 and 210 generate the first and second error signals based on the deviations in the determined conversion rate and the determined GMV of the first time interval with respect to the defined conversion rate and the defined GMV, respectively.

At step 416, the first and second control signals are generated at the check point of the second time interval. The feedback loop controllers 208 and 210 generate the first and second control signals based on the first and second error signals, respectively. The first and second control signals are generated to control the share-ride fares of the second share-ride bookings during the second time interval.

At step 418, the share-ride fares of the second share-ride bookings of the second time interval are changed to maximize the second share-ride bookings or the GMV in the second time interval. The processor 202 utilizes the first and second control signals to increase or decrease the share-ride fare of each of the second share-ride bookings associated with the subset of source-destination clusters. In an embodiment, the subset of source-destination clusters is selected from the set of source-destination clusters based on the estimated historical share-ride demands of each of the set of source-destination clusters in the second time interval. In another embodiment, the subset of source-destination clusters is selected from the set of source-destination clusters based on the conversion rate of each of the set of source-destination clusters in the first time interval. By increasing or decreasing the share-ride fare in the second time interval, the second share-ride bookings or the GMV may be maximized during the second time interval.

Figure 5:
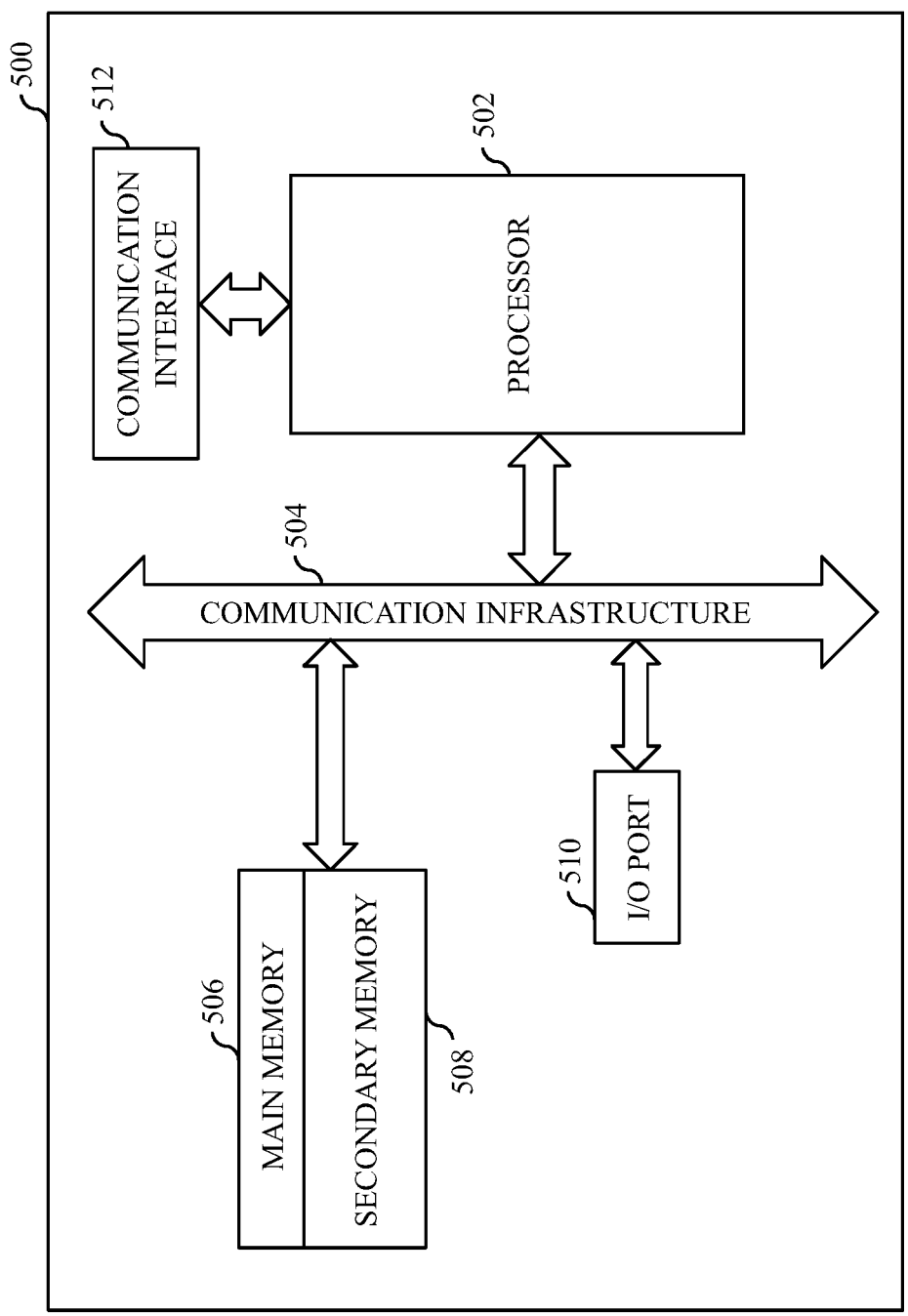
FIG. 5 is a block diagram that illustrates a computer system for maximizing share-ride bookings in a geographical area in a ride-sharing system, in accordance with an embodiment of the present invention.

Referring now to FIG. 5, a block diagram that illustrates a computer system 500 for maximizing the share-ride bookings in the geographical area in the ride-sharing system is shown, in accordance with an embodiment of the present invention. An embodiment of the present invention, or portions thereof, may be implemented as computer readable code on the computer system 500. In one example, the database server 102 and the application server 104 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 4.

The computer system 500 includes a processor 502 that may be a special purpose or a general purpose processing device. The processor 502 may be a single processor, multiple processors, or combinations thereof. The processor 502 may have one or more processor "cores." Further, the processor 502 may be connected to a communication infrastructure 504, such as a bus, a bridge, a message queue, the first or second communication network 106 or 112, multi-core message-passing scheme, or the like. The computer system 500 further includes a main memory 506 and a secondary memory 508. Examples of the main memory 506 may include random access memory (RAM), read-only memory (ROM), and the like. The secondary memory 508 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 500 further includes an input/output (I/O) port 510 and a communication interface 512. The I/O port 510 includes various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communications port, and the like. Data transferred via the communication interface 512 may be signals, such as electronic, electromagnetic, optical, or other signals as will be apparent to a person skilled in the art. The signals may travel via a communications channel, such as the first or second communication network 106 or 112 which may be configured to transmit the signals to the various devices that are communicatively coupled to the computer system 500. Examples of the communication channel may include, but are not limited to, cable, fiber optics, a phone line, a cellular phone link, a radio frequency link, a wireless link, and the like.

Computer program medium and computer usable medium may refer to memories, such as the main memory 506 and the secondary memory 508, which may be a semiconductor memory such as dynamic RAMs. These computer program mediums may provide data that enables the computer system 500 to implement the methods illustrated in FIG. 4. In an embodiment, the present invention is implemented using a computer implemented application. The computer implemented application may be stored in a computer program product and loaded into the computer system 500 using the removable storage drive or the hard disc drive in the secondary memory 508, the I/O port 510, or the communication interface 512.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 502, and a memory, such as the main memory 506 and the secondary memory 508, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present invention provide, among other features, systems and methods for maximizing the share-ride bookings in the geographical area in the ride-sharing system. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method for facilitating share-ride bookings in a geographical area, the method comprising:
   determining, by an application server, a set of source-destination clusters for the geographical area based on historical share-ride booking data;
   detecting, by the application server, a plurality of intent-related shared-ride demands based on a frequency of usage of a service application installed on a plurality of passenger devices of a plurality of passengers over a period of time;

estimating, by the application server, historical share-ride demands for the set of source-destination clusters based on historical share-ride demand data, wherein the historical share-ride demand data includes a count of intent-related share-ride demands of the plurality of intent-related shared-ride demands;

segmenting, by the application server, a time period into a plurality of time intervals such that each of the plurality of time intervals has an equal count of the estimated historical share-ride demands, wherein a start time of each of the plurality of time intervals is a check point of each of the plurality of time intervals;

determining, by the application server, a conversion rate and a gross merchandise value (GMV) per unit of distance for a first time interval of the plurality of time intervals, wherein the conversion rate and the GMV per unit of distance are determined at the check point of a second time interval of the plurality of time intervals based on first share-ride bookings associated with the first time interval;

generating, by the application server, a first error signal and a second error signal at the check point of the second time interval, wherein the first error signal is generated based on a deviation in the determined conversion rate with respect to a defined conversion rate and the second error signal is generated based on a deviation in the determined GMV per unit of distance of the first time interval with respect to a defined GMV per unit of distance;

selecting, by the application server, a subset of source-destination clusters from the set of source-destination clusters based on at least one of the estimated historical share-ride demands of each of the set of source-destination clusters in the second time interval or the conversion rate of each of the set of source-destination clusters in the first time interval; and generating, by the application server, a first control signal and a second control signal to control a share-ride fare of second share-ride bookings that are in the second time interval and associated with the selected subset of source-destination clusters, wherein the first control signal is generated based on the first error signal and the second control signal is generated based on the second error signal.

2. The method of claim 1, wherein the historical share-ride booking data and the historical share-ride demand data are extracted from a database server over a communication network.

3. The method of claim 2, wherein the set of source-destination clusters is determined based on pick-up and drop-off latitude and longitude information associated with the extracted historical share-ride booking data.

4. The method of claim 1, wherein each of the plurality of time intervals is associated with an end time, wherein the end time of the first time interval is the start time of the second time interval.

5. The method of claim 1, wherein the conversion rate for the first time interval is determined based on a ratio of a first count of the first share-ride bookings associated with the first time interval and a second count of the estimated historical share-ride demands associated with the first time interval.

6. The method of claim 1, wherein the GMV per unit of distance for the first time interval is determined based a ratio of a total share-ride fare associated with the first time interval and a total share-ride distance associated with the first time interval.

7. The method of claim 6, wherein the total share-ride fare associated with the first time interval is determined based on a first sum of share-ride fares of the first share-ride bookings associated with the first time interval, and wherein the total share-ride distance associated with the first time interval is determined based on a second sum of share-ride distances of the first share-ride bookings associated with the first time interval.

8. The method of claim 1, wherein the generated first and second control signals are utilized to increase or decrease the share-ride fare of each of the second share-ride bookings associated with the subset of source-destination clusters in the second time interval.

9. The method of claim 1, where in the historical share-ride demand data further includes a count of confirmed historical share-ride bookings, and a count of cancelled share-ride bookings.

10. A system to facilitate share-ride bookings in a geographical area, the system comprising:

a processor configured to:
determine a set of source-destination clusters for the geographical area based on historical share-ride booking data;

detect a plurality of intent-related shared-ride demands based on a frequency of usage of a service application installed on a plurality of passenger devices of a plurality of passengers over a period of time;

estimate historical share-ride demands for the set of source-destination clusters based on historical share-ride demand data, wherein the historical share-ride demand data includes a count of intent-related share-ride demands of the plurality of intent-related shared-ride demands;

segment a time period into a plurality of time intervals such that each of the plurality of time intervals has an equal count of the estimated historical share-ride demands wherein a start time of each of the plurality of time intervals is a check point of each of the plurality of time intervals; and determine a conversion rate and a gross merchandise value (GMV) per unit of distance for a first time interval of the plurality of time intervals, wherein the conversion rate and the GMV per unit of distance are determined at the check point of a second time interval of the plurality of time intervals based on first share-ride bookings associated with the first time interval; and a feedback loop controller configured to:
generate a first error signal and a second error signal at the check point of the second time interval, wherein the first error signal is generated based on a deviation in the determined conversion rate with respect to a defined conversion rate and the second error signal is generated based on a deviation in the determined GMV per unit of distance of the first time interval with respect to a defined GMV per unit of distance;

select a subset of source-destination clusters from the set of source-destination clusters based on at least one of the estimated historical share-ride demands of each of the set of source-destination clusters in the second time interval or the conversion rate of each of the set of source-destination clusters in the first time interval; and generate a first control signal and a second control signal to control a share-ride fare of second share-ride bookings that are in the second time interval and associated with the selected subset of source-destination clusters, wherein the first control signal is generated based on the first error signal and the second control signal is generated based on the second error signal.

11. The system of claim 10, wherein the processor is further configured to extract the historical share-ride booking data and the historical share-ride demand data from a database server over a communication network.

12. The system of claim 11, wherein the processor is further configured to determine the set of source-destination clusters based on pick-up and drop-off latitude and longitude information associated with the extracted historical share-ride booking data.

13. The system of claim 10, wherein each of the plurality of time intervals is associated with an end time, wherein the end time of the first time interval is the start time of the second time interval.

14. The system of claim 10, wherein the processor is further configured to determine the conversion rate for the first time interval based on a ratio of a first count of the first share-ride bookings associated with the first time interval and a second count of the estimated historical share-ride demands associated with the first time interval.

15. The system of claim 10, wherein the processor is further configured to determine the GMV per unit of distance for the first time interval based a ratio of a total share-ride fare associated with the first time interval and a total share-ride distance associated with the first time interval.

16. The system of claim 15, wherein the processor is further configured to:
   determine the total share-ride fare associated with the first time interval based on a first sum of share-ride fares of the first share-ride bookings associated with the first time interval; and
   determine the total share-ride distance associated with the first time interval based on a second sum of share-ride distances of the first share-ride bookings associated with the first time interval.

17. The system of claim 10, wherein the generated first and second control signals are utilized to increase or decrease the share-ride fare of each of the second share-ride bookings associated with the subset of source-destination clusters in the second time interval.

* * * * *